(12) United States Patent
Chen et al.

(10) Patent No.: US 11,733,558 B1
(45) Date of Patent: Aug. 22, 2023

(54) CURVED OPTIC STRUCTURE AND METHOD OF MANUFACTURING THEREOF

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

(72) Inventors: Po Lun Chen, Guangdong (CN); Yun Pei Chen, Guangdong (CN); Che Wen Chiang, Guangdong (CN); I Chen Liu, Guangdong (CN)

(73) Assignees: Interface Technology (ChengDu) Co., Ltd., Sichuan (CN); Interface Optoelectronics (ShenZhen) Co., Ltd., Guangdong (CN); Interface Optoelectronix (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 17/805,690

(22) Filed: Jun. 7, 2022

(30) Foreign Application Priority Data

Apr. 28, 2022 (CN) .......................... 202210480331.4

(51) Int. Cl.
*G02F 1/1333* (2006.01)
*G02F 1/1335* (2006.01)

(52) U.S. Cl.
CPC .. *G02F 1/133354* (2021.01); *G02F 1/133305* (2013.01); *G02F 1/133528* (2013.01)

(58) Field of Classification Search
CPC ......... G02F 1/133354; G02F 1/133528; G02F 1/133305; G02F 1/133368; G02F 2201/56; G06F 1/1652; G09G 2380/02
See application file for complete search history.

(56) References Cited

U.S. PATENT DOCUMENTS

| | | | |
|---|---|---|---|
| 2001/0030726 A1* | 10/2001 | Yoshida | G02F 1/133634 349/117 |
| 2013/0300958 A1* | 11/2013 | Matsuhiro | H04N 13/315 359/465 |
| 2016/0238881 A1* | 8/2016 | Chong | G02F 1/133528 |
| 2020/0073176 A1* | 3/2020 | Miyazaki | G02F 1/133305 |
| 2021/0048673 A1* | 2/2021 | Yan | G02B 26/06 |
| 2021/0132430 A1* | 5/2021 | Mun | G02F 1/133305 |
| 2021/0173134 A1* | 6/2021 | Peng | G02B 27/0172 |

\* cited by examiner

*Primary Examiner* — Mariam Qureshi
(74) *Attorney, Agent, or Firm* — CKC & Partners Co, LLC

(57) ABSTRACT

A curved optic structure includes an optic film, a polarizer and a liquid crystal compensation film. The optic film includes a light incident side and a light exit side. The optic film has a curved surface on the light exit side. The polarizer is conformally attached on the curved surface. The liquid crystal compensation film is disposed at the light exit side of the optic film. The polarizer is located between the optic film and the liquid crystal compensation film. The liquid crystal compensation film includes a liquid crystal layer and a power supply. The liquid crystal layer includes a plurality of liquid crystals inside. The power supply is connected to a first side surface and an opposite second side surface of the liquid crystal layer.

15 Claims, 13 Drawing Sheets

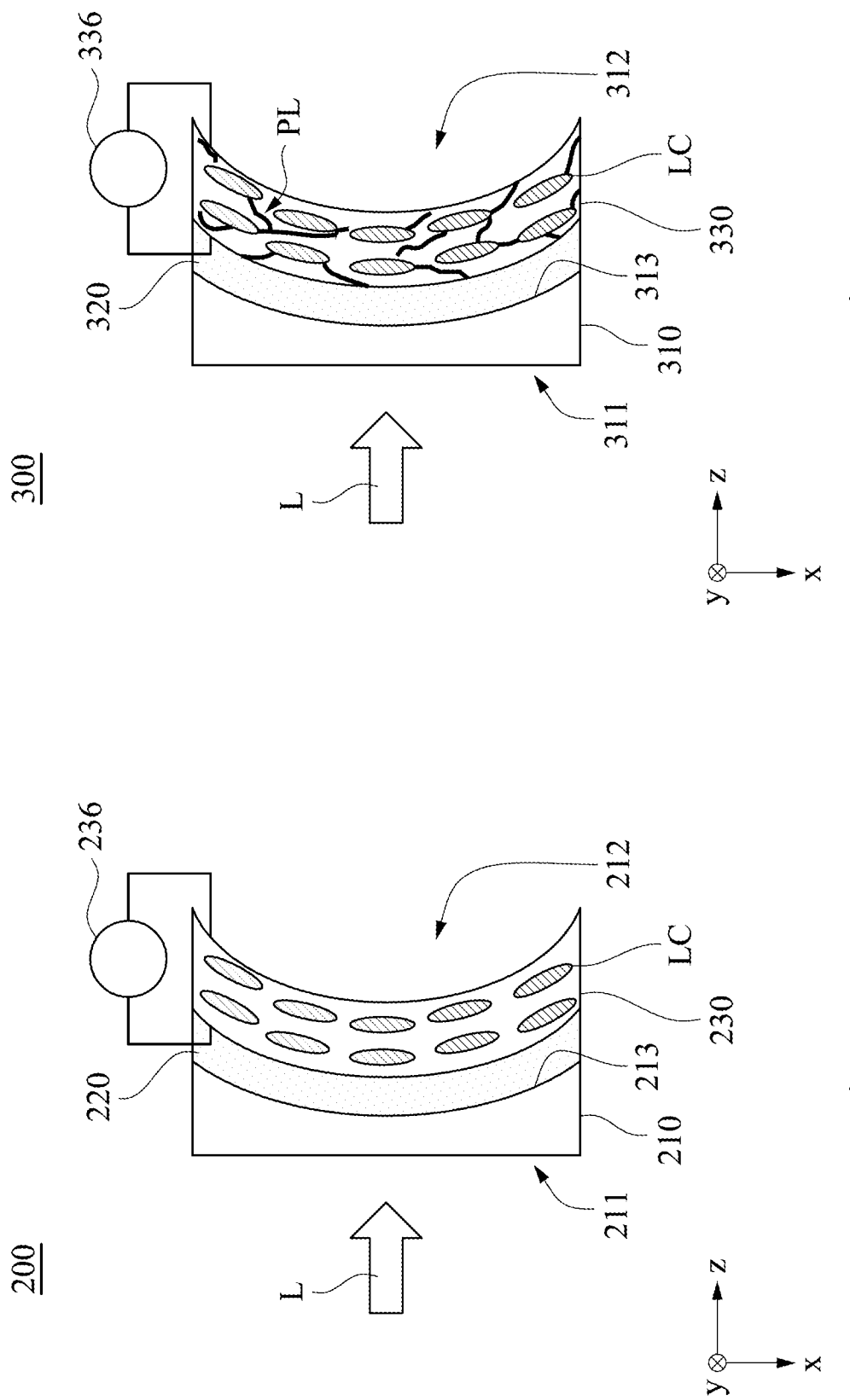

CURVED OPTIC STRUCTURE AND METHOD OF MANUFACTURING THEREOF

RELATED APPLICATIONS

This application claims priority to China Application Serial Number 202210480331.4, filed Apr. 28, 2022, which is herein incorporated by reference in its entirety.

BACKGROUND

Field of Invention

The present disclosure relates to curved optic structures and methods of manufacturing curved optic structures.

Description of Related Art

Generally, polarizers can be attached to flat optical products to improve visual effects. With the development and breakthrough of optical product specifications, a solution is to apply to curved polarizers. However, the optical properties of the curved polarizer changes slightly due to the reflection of polarization, thereby not matching the original design.

If the polarizer is to be attached to a curved surface, birefringence characteristics would be generated due to deformation such as bending, resulting in phase retardation or changes of polarization state. The birefringence characteristics of the polarizer will change linearly or non-linearly due to the curvature of the surface to be bonded, the stress of the product process or the stretching of the polarizer, so that the positions of the polarizer on the bonding surface is unexpected, and it also changes the optical properties of the polarizer, such as transmittance, haze, contrast, color point, and more. Therefore, how to provide a technical solution to improve the design of the optical deviation of the product due to bending when the polarizer is used on a curved structure is one of the problems to be solved by those skilled in the art.

SUMMARY

An aspect of the present disclosure is related to a curved optic structure.

According to one or more embodiments of the present disclosure, a curved optic structure includes an optic film, a polarizer and a liquid crystal compensation film. The optic film includes a light incident side and a light exit side. The optic film has a curved surface on the light exit side. The polarizer is conformally attached on the curved surface. The liquid crystal compensation film is disposed at the light exit side of the optic film. The polarizer is located between the optic film and the liquid crystal compensation film. The liquid crystal compensation film includes a liquid crystal layer and a power supply. The liquid crystal layer includes a plurality of liquid crystals inside. The power supply is connected to a first side surface and an opposite second side surface of the liquid crystal layer.

In one or more exemplary embodiments of the present disclosure, the optic film, the polarizer and the liquid crystal compensation film are sequentially arranged along a first direction. The curved surface of the optic film protrudes from or is recessed from a plane perpendicular to the first direction.

In one or more exemplary embodiments of the present disclosure, the optic film, the polarizer and the liquid crystal compensation film are sequentially arranged along a first direction. The liquid crystal layer of the liquid crystal compensation film is extended along a plane perpendicular to the first direction. The curved surface of the optic film protrudes from or is recessed from the plane along the first direction.

In one or more exemplary embodiments of the present disclosure, the curved surface includes a cylindrical surface, a spherical surface or a symmetrical aspheric surface.

In one or more exemplary embodiments of the present disclosure, a gap is between the polarizer and the liquid crystal compensation film.

In one or more exemplary embodiments of the present disclosure, an optical transparent adhesive is filled in a gap between the polarizer and the liquid crystal compensation film.

In one or more exemplary embodiments of the present disclosure, the polarizer has a first polarization region and a second polarization region, and the first polarization region and the second polarization region of the polarizer correspond to different positions on the curved surface of the optic film, respectively. The liquid crystal layer has a first compensation region and a second compensation region, the first compensation region of the liquid crystal layer corresponds to a projection of the first polarization region of the polarizer on the liquid crystal layer, the second compensation region of the liquid crystal layer a compensation region corresponding to a projection of the second polarized region of the polarizer on the liquid crystal layer. A first phase retardation of the first polarization region plus a first compensation phase retardation of the first compensation region is equal to a second phase retardation of the second polarization region plus a second compensation phase retardation of the second compensation region.

In one or more exemplary embodiments of the present disclosure, the liquid crystal layer of the liquid crystal compensation film further includes a first alignment film and a second alignment film. The liquid crystals are filled between the first alignment film and the second alignment film.

In one or more exemplary embodiments of the present disclosure, the liquid crystal compensation film is attached to the polarizer. The liquid crystal layer of the liquid crystal compensation film is conformal to the curved surface of the optic film.

In one or more exemplary embodiments of the present disclosure, the liquid crystal compensation film is attached to the polarizer. The liquid crystal layer of the liquid crystal compensation film is conformal to the curved surface of the optic film. The liquid crystal layer further includes a polymeric material.

In one or more exemplary embodiments of the present disclosure, the liquid crystal layer includes a plurality of liquid crystal sublayers. Each of the liquid crystal sublayer includes one or more of the liquid crystals.

In one or more exemplary embodiments of the present disclosure, the liquid crystal compensation film further includes a first transparent substrate, a first transparent electrical control structure, a second transparent substrate and a second transparent electrical control structure. The first transparent electrical control structure is disposed on a surface of the first transparent substrate, on the first side surface of the liquid crystal layer and connected to the power supply. The second transparent electrical control structure is disposed on a surface of the second transparent substrate, on the second side surface of the liquid crystal layer and connected to the power supply. The liquid crystal layer is located between the first transparent electrical control structure and the first transparent electrical control structure.

In some embodiments, the first transparent substrate and the second transparent substrate are flexible.

In some embodiments, at least one of the first transparent electrical control structure and the second transparent electrical control structure includes a plurality of thin film transistors.

In one or more exemplary embodiments of the present disclosure, the optic film and the polarizer have negative diopters.

An aspect of the present disclosure is related to a method of manufacturing a curved optic structure.

According to one or more embodiments of the present disclosure, a method of manufacturing a curved optic structure includes following operations. A polarizer is attached to a curved surface of an optic film to form a product and optically measuring a plurality of phase retardations of a plurality of polarized regions of the product. A simulation of a liquid crystal layer is performed based on the measured phase retardations of the product to obtain one or more liquid crystal parameters, wherein the liquid crystal layer includes a plurality of compensation regions corresponding to the polarization regions of the product, and each of the compensation region with the one or more liquid crystal parameters has a compensation phase retardation. The liquid crystal layer is manufactured and a power supply is connected to a first side surface and an opposite second side surface of the liquid crystal layer to form a liquid crystal compensation film. The one or more liquid crystal parameters are applied to the liquid crystal layer by the power supply and the liquid crystal compensation film is optically measured to confirm whether a plurality of compensation phase retardations of the compensation regions of the formed liquid crystal layer and the simulations are match. The liquid crystal compensation film is assembled with the product.

In one or more exemplary embodiments of the present disclosure, optically measuring the polarization regions of the product includes following operations. A first beam is emitted to a beam splitter by a laser light source. A second beam is split from the first beam by the beam splitter and receiving the second beam by a first photodetector. A third beam is split from the first beam by the beam splitter to pass through one of the polarization regions of the product and receiving the third beam passing through the one of the polarization regions by a second photodetector. A phase difference between the second beam and the third beam is computed by an operator.

In one or more exemplary embodiments of the present disclosure, optically measuring the liquid crystal compensation film includes following operations. A beam is emitted by a laser light source to pass through one of the compensation regions of the liquid crystal layer. The beam passing through the one of the compensation regions is received by a photodetector. The liquid crystal compensation film is rotated, so that an incident angle of the beam relative to the one of the compensation regions is changed.

In one or more exemplary embodiments of the present disclosure, performing the simulation of the liquid crystal layer based the measured phase retardations of the product includes following operations. A plurality of simulated phase retardations of a liquid crystal of the liquid crystal layer at a plurality of pretilt angles is calculated.

In one or more exemplary embodiments of the present disclosure, the liquid crystal layer of the liquid crystal compensation film further includes an alignment film, when the liquid crystal layer is electrically controlled by the power supply, a plurality of liquid crystals inside the liquid crystal layer is arranged based on the alignment film.

In one or more exemplary embodiments of the present disclosure, the liquid crystal compensation film is assembled with the product before the liquid crystal compensation film is optically measured.

In summary, the curved optic structure and the manufacturing method of the present disclosure can compensate the different phase retardation of the different polarization regions of the bent polarizer by using the liquid crystal compensation film, which can improve the birefringence properties caused by the curved surface of the optic film being attached to the polarizer.

It is to be understood that both the foregoing general description and the following detailed description are by examples, and are intended to provide further explanation of the disclosure as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the disclosure.

FIG. 5 illustrates a top view of a curved optic structure according to one embodiment of the present disclosure;

FIG. 6 illustrates a top view of a curved optic structure according to one embodiment of the present disclosure;

FIG. 11B is a schematic diagram simulating a liquid crystal arrangement in

FIG. 11A;

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as used in the field, in the context of the invention and in the context of the particular content unless particularly specified. Some terms used to describe the invention are to be discussed below or elsewhere in the specification to provide additional guidance related to the description of the invention to specialists in the art.

The phrases "first," "second," etc., are solely used to separate the descriptions of elements or operations with the same technical terms, and are not intended to convey a meaning of order or to limit the invention.

Additionally, the phrases "comprising," "includes," "provided," and the like, are all open-ended terms, i.e., meaning including but not limited to.

Further, as used herein, "a" and "the" can generally refer to one or more unless the context particularly specifies otherwise. It will be further understood that the phrases "comprising," "includes," "provided," and the like used herein indicate the stated characterization, region, integer, step, operation, element and/or component, and does not exclude additional one or more other characterizations, regions, integers, steps, operations, elements, components and/or groups thereof.

In order to improve that the optical properties of the polarizer deviate from the original design due to the bending of the polarizer when the polarizer is applied to a curved surface, a liquid crystal compensation film integrated is provided in the present disclosure. By using well-controlled localized properties and birefringence properties of liquid crystals, issue from the bent polarizers can be compensated.

Figure 1:
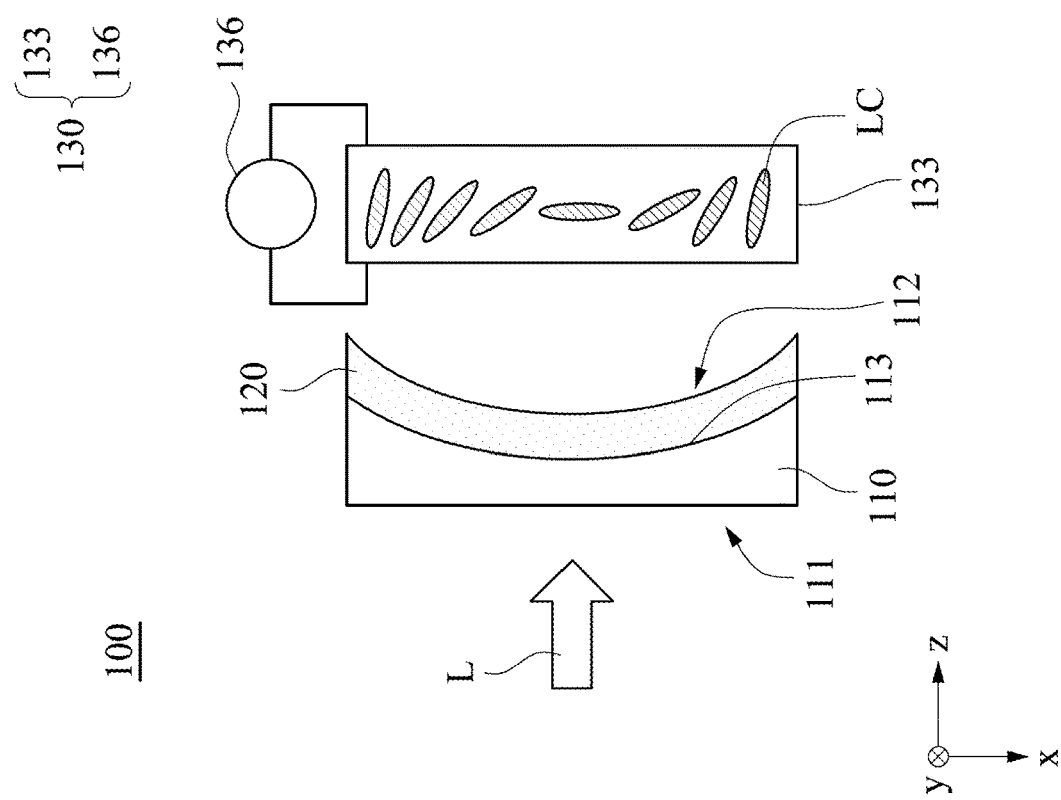
FIG. 1 illustrates a top view of a curved optic structure according to one embodiment of the present disclosure.

FIG. 1 illustrates a top view of a curved optic structure 100 according to one embodiment of the present disclosure.

As shown in FIG. 1, according to an exemplary embodiment of the present disclosure, the curved optic structure 100 includes an optic film 110, a polarizer 120 and a liquid crystal compensation film 130. In this exemplary embodiment, the optic film 110, the polarizer 120 and the liquid crystal compensation film 130 are sequentially arranged along z direction.

In some embodiments, the optic film 110 is, for example, an optical lens. In some embodiments, the optic film 110 is, for example, a transparent cover plate, which is disposed on the light-emitting device or the display module. The transparent cover can be a glass cover.

For example, in this exemplary embodiment as shown in FIG. 1, the optic film 110 includes an opposite light incident side 111 and a light exit side 112. In FIG. 1, the beam L may be incident from the light incident side 111 of the optic film 110 along the z direction, pass through the optic film 110 and exit from the light exit side 112 of the optic film 110. The beam L can come from a light-emitting device or a display module, and the light-emitting device or the display module that emits the beam L is disposed on the light incident side 111 of the optic film 110.

As shown in FIG. 1, in this exemplary embodiment, on the light-emitting side 112 of the optic film 110, the optic film 110 has a curved surface 113. The curved surface 113 is concave toward the center of the optic film 110 along the negative z direction. In other words, the curved surface 113 of the optic film 110 is concave toward the negative z direction relative to an x-y plane perpendicular to the z direction.

It should be noted that FIG. 1 shows an exemplary embodiment of the curved surface 113 of the present disclosure, and the shape of the curved surface 113 is not limited by FIG. 1. For example, in some embodiments, the curved surface 113 can be a convex curved surface that protrudes along the positive z direction, so that the curved surface 113 is convex toward the positive z direction relative to an x-y plane that is perpendicular to the z direction. In some embodiments, the optic film 110 can also have another curved surface different from the curved surface 113.

Further, as shown in the top view of FIG. 1, the curved surface 113 of the optic film 110 can be a cylindrical surface. In other words, any line segments extending in the y-direction on the curved surface 113 are parallel to each other, so that the curved surface 113 has a shape similar to a surface of a cylinder.

It should be noted that FIG. 1 shows an exemplary embodiment of the curved surface 113 of the present disclosure, but the shape of the curved surface 113 of the optic film 110 of the present disclosure is not limited thereto. For example, the curved surface 113 can include a spherical surface, or the curved surface 113 can include a symmetrical aspheric surface.

The polarizer 120 is configured to change the polarization direction of light and convert unpolarized light into polarized light. In FIG. 1, the polarizer 120 is conformally attached to the curved surface 113 of the optic film 110.

The polarizer 120 is flexible. Generally, the polarizer 120 can be arranged on a planar structure and different local regions of the polarizer 120 on the planar structure can have the same optical properties. However, in one or more embodiments of the present disclosure, since the polarizer 120 is attached to the curved surface 113, the optical properties on different regions of the polarizer 120 would change.

For example, as shown in FIG. 1, in this exemplary embodiment, the polarizer 120 is attached to the curved surface 113, and the curved surface 113 is a concave curved surface concave along the negative z direction. After the generally flat polarizer 120 is attached to the curved surface 113, the side of the polarizer 120 that contacts the curved surface 113 may be subjected to outward expansion stress and be stretched, and another side of the polarizer 120 may be subjected to the stress of shrinkage and compressed, so that the polarizer 120 is deformed. That is, for example, the polarizer 120 would be bent. The bending of the polarizer 120 results in changes in the optical properties at different local regions of the polarizer 120.

In some embodiments of the present disclosure, the optic film 110 and the polarizer 120 have negative diopters. In other words, after the polarizer 120 is assembled on the optic film 110, a product formed by the assembled optic film 110 and the polarizer 120 has a negative diopter.

In some embodiments, the curved surface 113 can also be a convex curved surface. When the polarizer 120 is attached to the convex curved surface, different local regions of the polarizer 120 would also be subjected to different stresses, resulting in deformation of the polarizer 120, which in turn affects the optical properties of different local regions of polarizer 120.

Please return to FIG. 1. In some embodiments, since the polarizer 120 is bent, different local areas of the polarizer 120 would have different birefringence properties, so that the obtained phase retardation varies when the light beam passes through different local areas of the polarizer 120. The bending of the polarizer 120 also affects changes in optical properties at different local areas of the polarizer 120, such as transmittance, haze, contrast, color point at different local areas of the polarizer 120, and the like.

For the polarizer 120 bonded to the curved surface, different local areas or even local points on the polarizer 120 have different birefringence characteristics. If there is symmetry with the shape of the curved surface 113, inverse phase compensations for different local areas of the polarizer 120 can be provided by adding an electrically controlled liquid crystal device and/or a non-homogeneous polymer material, so that unexpected optical properties of the polarizer 120 caused by the deformation of the polarizer 120 due to the curved surface bonding can be reduced.

In details, in order to compensate for the different phase retardation at different local regions of the polarizer 120 being attached to the curved surface 113 due to deformations of the polarizer 120, the curved optic structure 100 further includes a liquid crystal compensation film 130. Since the liquid crystal material has birefringence properties and the optical properties of the liquid crystal can be locally adjusted by electronic control, the liquid crystal compensation film 130 can be provided to compensate the phase retardation from different local regions of the polarizer 120.

As shown in FIG. 1, in this exemplary embodiment, the liquid crystal compensation film 130 includes a liquid crystal layer 133 and a power supply 136. The liquid crystal layer 133 includes a plurality of liquid crystals LC inside the liquid crystal layer 133. A plurality of liquid crystals LC is arranged inside the liquid crystal layer 133. The power supply 136 is connected to a first side and a second side opposite to the first side of the liquid crystal layer 133. The power supply 136 can apply bias voltages to the two opposite sides of the liquid crystal layer 133 to generate an electric field inside the liquid crystal layer 133, so that the alignment direction of the liquid crystals LC inside the liquid crystal layer 133 can be controlled by the power supply 136.

It should be noted that the liquid crystal compensation film 130 shown in FIG. 1 is an example, and the present disclosure should not be limited by this example. In some embodiments, the liquid crystal compensation film 130 can further include one or more other optical substrates, transparent circuits or transparent electrodes. In one or more embodiments of the present disclosure, the liquid crystal compensation film 130 can further include a plurality of thin film transistors used to locally control the alignment of the liquid crystals LC at a plurality of different local regions of the liquid crystal compensation film 130.

In this exemplary embodiment, as shown in FIG. 1, the liquid crystal layer 133 of the liquid crystal compensation film 130 extends along the x-y plane perpendicular to the z direction, wherein the curved surface 113 and the polarizer 120 conformally attached to the curved surface 113 is concave in the negative z direction relative to the x-y plane.

In some embodiments, the liquid crystal layer 133 further includes an alignment film. The alignment film is configured to adjust the alignment of the liquid crystals LC. By designing the alignment film of the liquid crystal layer 133 according to the phase retardation at different local regions of the bent polarizer 120, the liquid crystals LC in the liquid crystal layer 133 can be arranged to compensate for the phase retardation in different local regions of the polarizer 120.

Further, the power supply 136 shown in FIG. 1 is schematically connected to two opposite sides of the liquid crystal layer 133 to apply a bias voltage to control the arrangement of the liquid crystals LC, but this does not limit the configuration of the power supply 136 in the present disclosure. For example, the power supply 136 can be connected to opposite sides of the liquid crystal layer through wires, respectively. In some embodiments, the power supply 136 is connected to the transparent electrodes on the two opposite sides of the liquid crystal layer 133 to provide an electric field inside the liquid crystal layer 133 to adjust the liquid crystals LC.

Therefore, although unexpected phase retardations are produced at different local regions of the polarizer 120 attached to the curved surface 113 of the optic film 110, the phase can retardation can still be compensated by the liquid crystal compensation film 130.

In one or more embodiments of the present disclosure, when the beam L enters the curved optic structure 100 from the light incident side 111 of the optic film 110, the beam L exits from the curved surface 113, passes through the polarizer 120 and is converted into polarized light with phase retardations. Then, the beam L passes through the liquid crystal compensation film 130 to obtain compensation phase retardation via the liquid crystal layer 133 electrically controlled by the power supply 136, so that the phase retardation from the polarizer 120 can be canceled.

As shown in FIG. 1, in this exemplary embodiment, a gap is formed between the polarizer 120 and the liquid crystal compensation film 130. In one or more embodiments, one or more other elements or layers may be formed between the polarizer 120 and the liquid crystal compensation film 130.

Figure 2:
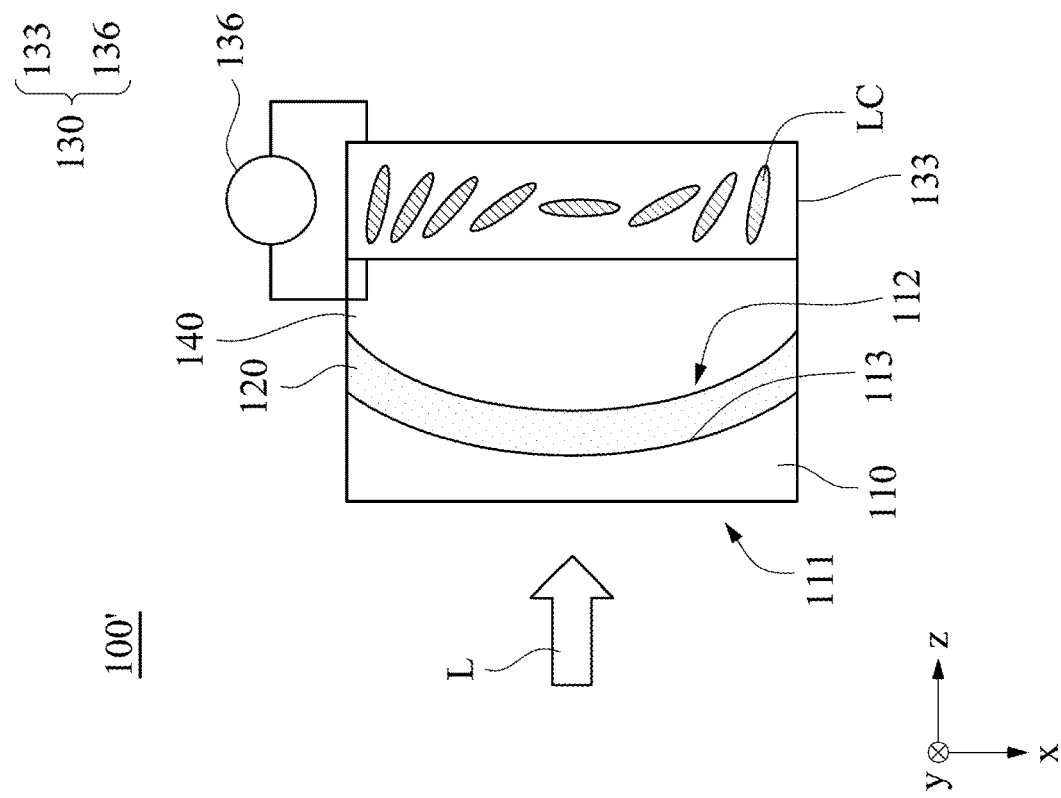
FIG. 2 illustrates a top view of a curved optic structure according to one embodiment of the present disclosure.

Reference is made by FIG. 2 as an example. FIG. 2 illustrates a top view of a curved optic structure 100' according to one embodiment of the present disclosure. Similar elements use the same reference labels as FIG. 1. A difference between the curved optic structure 100' and the curved optic structure 100 is that the curved optic structure 100' further includes an optical insulating adhesive 150, and the optical insulating adhesive 150 can be filled between the polarizer 120 and the liquid crystal compensation film 130. The optical insulating adhesive 150 may be transparent. In some embodiments of the present disclosure, that a material is transparent may mean the optical transmittance of the material is 100% or close to 100%, and transparent material would not affect light or beam traveling.

In some embodiments, the optically transparent adhesive 140 can be disposed along the edges of the polarizer 120 and the liquid crystal compensation film 130, and the polarizer 120 and the liquid crystal compensation film 130 are attached to each other by a frame sticking process.

Figure 3:
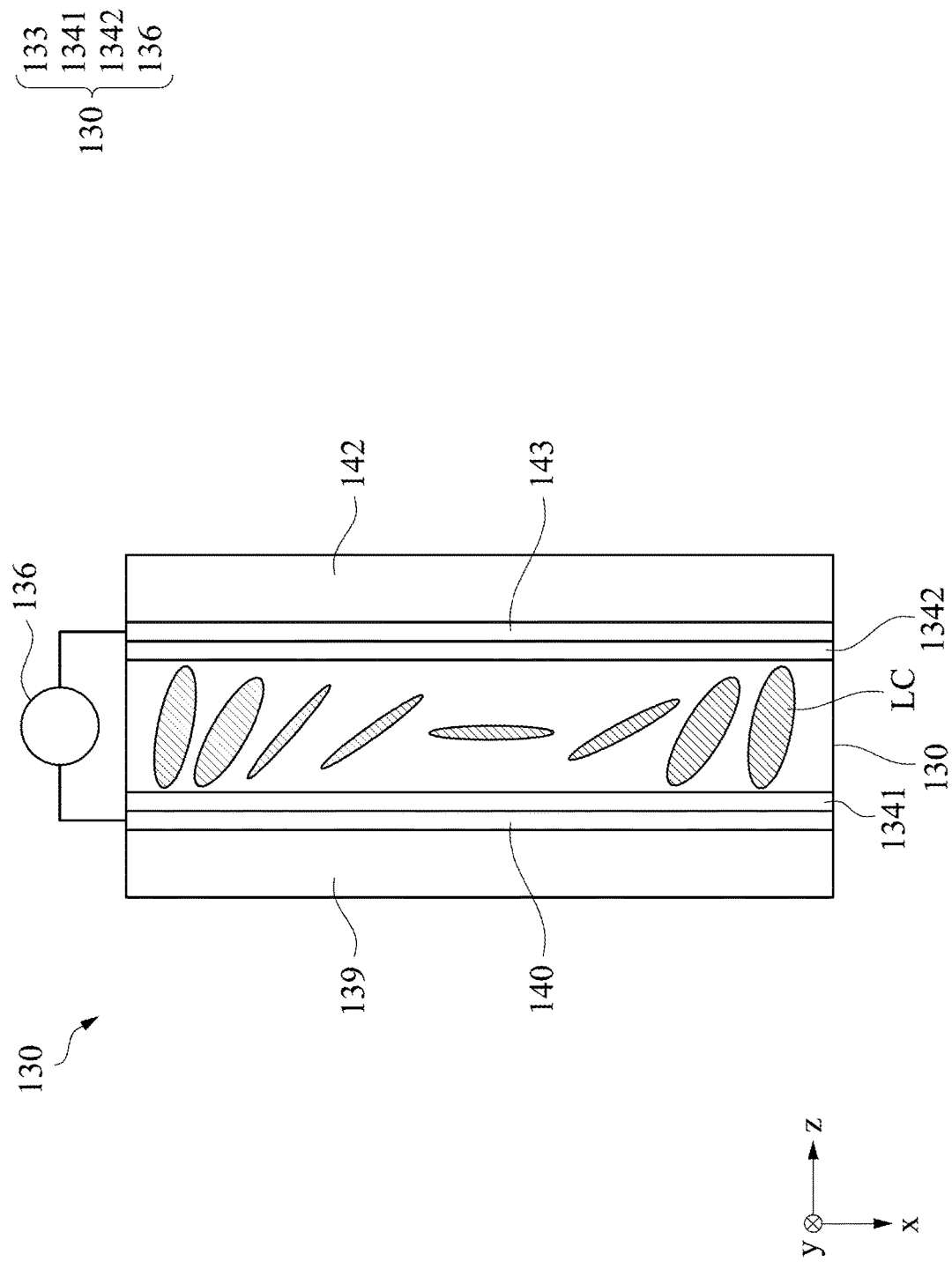
FIG. 3 illustrates a top view of a liquid crystal compensation film according to one embodiment of the present disclosure.

Reference is made by FIG. 3. FIG. 3 illustrates a top view of a liquid crystal compensation film 130 according to one embodiment of the present disclosure. FIG. 3 shows an embodiment of the liquid crystal compensation film 130, but the configuration of the liquid crystal compensation film 130 should not excessively limit to the present disclosure.

As shown in FIG. 3, in this exemplary embodiment, the liquid crystal compensation film 130 includes a liquid crystal layer 133, a power supply 136, a first transparent substrate 139, a second transparent substrate 142, a first electrical control structure 140 and a second electrical control structure 143.

The liquid crystal layer 133 includes liquid crystals LC and an first alignment film 1341 and an opposite second alignment film 1342 inside, wherein the liquid crystals LC is filled between the first alignment film 1341 and the second alignment film 1342, so that the liquid crystals LC can be are arranged based on designed conditions of the first alignment film 1341 and the second alignment film 1342.

The liquid crystal layer 133 is located between the first transparent substrate 139 and the second transparent substrate 142. In some embodiments, the materials of the first transparent substrate 139 and the second transparent substrate 142 include glass substrates or resin substrates, but are not limited thereto. In some embodiments, the first transparent substrate 139 and the second transparent substrate 142 are flexible and can be attached to the polarizer 120 with a curved surface. For example, please refer to the following FIGS. 5 and 6.

The first electrical control structure 140 is located on the surface of the first transparent substrate 139 and is directly adjacent to a side surface of the liquid crystal layer 133. The second electrical control structure 143 is located on the surface of the second transparent substrate 142 and is directly adjacent to the other side of the liquid crystal layer 133. The power supply 136 is connected to the first electrical control structure 140 and the second electrical control structure 143. In other words, the first electrical control structure 140 is located between the surface of the first transparent substrate 139 and the liquid crystal layer 133, and the second electrical control structure 143 is located between the surface of the second transparent substrate 142 and the liquid crystal layer 133. The power supply 136 is electrically connected to two opposite sides of the liquid crystal layer 133 through the first electrical control structure 140 and the second electrical control structure 143 to provide an electric field into the liquid crystal layer 133 to control the alignment of the liquid crystals LC.

In some embodiments, the first electrical control structure 140 and the second electrical control structure 143 may include transparent wires and/or electrodes. For example, but not limited thereto, the first electrical control structure 140 and the second electrical control structure 143 may include indium tin oxide films or thin metal wires. As such, by connecting the first electrical control structure 140 and the second electrical control structure 143 to the power supply 136 and applying a bias voltage from the power supply 136 to the first electrical control structure 140 and the second electrical control structure 143, the first electrical control structure 140 and the second electrical control structure 143 can provide an electric field inside the liquid crystal layer 133, so that the arrangement of a plurality of liquid crystals LC is controlled.

In some embodiments, one or more of the first electrical control structure 140 and the second electrical control structure 143 further include a plurality of thin film transistors. For example, a plurality of thin film transistors can be arranged in a matrix and respectively corresponds to different local regions of the liquid crystal layer 133. By supplying a working bias voltage to the thin film transistors through the power supply 136, the liquid crystals LC arranged in different local regions of the liquid crystal layer 133 can be adjusted locally, thereby providing different compensation phase retardation in different local regions of the liquid crystal layer 133.

Figure 4:
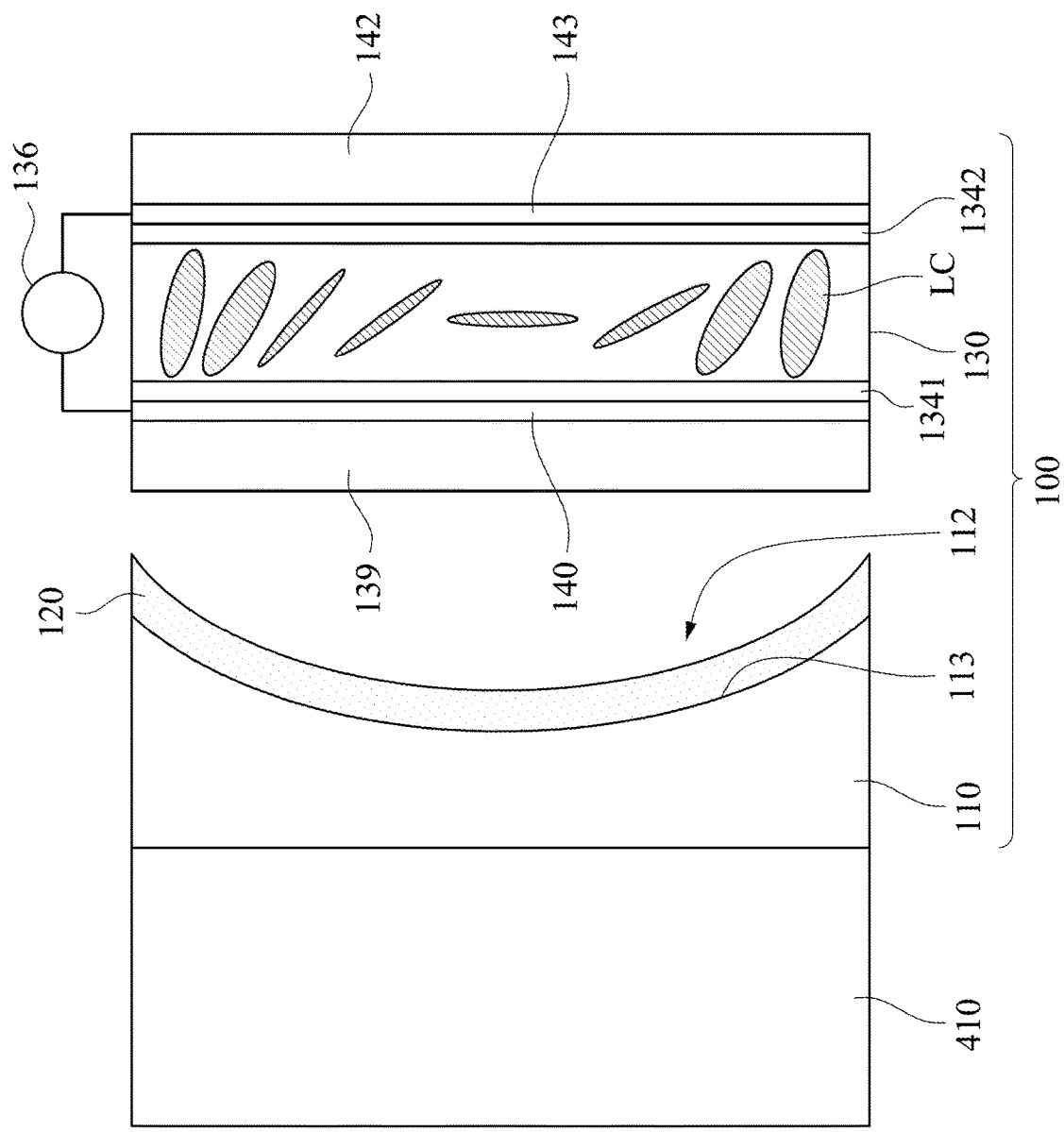
FIG. 4 illustrates a top view of a curved optic device according to one embodiment of the present disclosure.

In one or more embodiments of the present disclosure, the curved optic structure 100 can be integrated with different types of optical devices, such as VR Pancake lenses or curved displays. Reference is made by FIG. 4. FIG. 4 illustrates a top view of a curved optic device 400 according to one embodiment of the present disclosure. FIG. 4 exemplarily illustrates a configuration in which the curved optic structure 100 of the present disclosure is integrated with the curved display device 400.

As shown in FIG. 4, in this exemplary embodiment, a curved optic structure 100 illustrated in FIG. 3 is disposed on a surface of a light-emitting module 410. The optic film 110 of the curved optic structure 100 can be regarded as a transparent cover of the light emitting module 410. In some embodiments, the light-emitting module 410 may be an optical display device. For example, the optical display device may be a liquid crystal display device, one or more light conversion layers may be provided on an interface between the light-emitting module 410 and the optic film 110 to form pixels, and the light-emitting module 410 may have other liquid crystal layer (not shown in FIG. 4) adjusting the pixels to display the image.

Reference is made by FIG. 5. FIG. 5 illustrates a top view of a curved optic structure 200 according to one embodiment of the present disclosure.

In FIG. 5, the curved optic structure 200 includes an optic film 210, a polarizer 220 and a liquid crystal compensation film 230. The optic film 210 includes a light incident side 211 and a light exit side 212, and the beam L can be incident from the light incident side 211 of the optic film 210. The optic film 210 has a curved surface 213 on the light-emitting side 212. The liquid crystal compensation film 230 includes a liquid crystal layer 233 and a power supply 236. In this exemplary embodiment, the liquid crystal compensation film 230 is further directly attached to the deformed polarizer 220, and the liquid crystal layer 233 of the liquid crystal compensation film 230 conforms to the curved surface 213 of the optic film 210. In the curved optic structure 200 shown in FIG. 5, the original birefringence properties of the liquid crystals LC in the liquid crystal layer 233 can be used to directly perform inverse compensation on the polarizer 220 attached to the curved surface without additionally designing an alignment film for the liquid crystal layer 233.

Reference is made by FIG. 6. FIG. 6 illustrates a top view of a curved optic structure 300 according to one embodiment of the present disclosure.

In FIG. 6, the curved optic structure 300 includes an optic film 310, a polarizer 320 and a liquid crystal compensation film 330. The optic film 310 includes a light incident side 311 and a light exit side 312, and the beam L can be incident from the light incident side 311 of the optic film 310. The optic film 310 has a curved surface 313 on the light-emitting side 312. The liquid crystal compensation film 330 includes a liquid crystal layer 333 and a power supply 336. In this exemplary embodiment, the liquid crystal compensation film 330 is directly attached to the deformed polarizer 320, the liquid crystal layer 133 of the liquid crystal compensation film 330 is conformal to the curved surface 313 of the optic film 310, and the crystal layer 333 further has a plurality of polymer materials PL are located inside the liquid crystal layer 333. In some embodiments, the polymer material PL is non-homogeneous. The molecules of the polymer material PL would be stretched, rotated and deformed differently due to their polymer chains, which also cause birefringence and can also compensate the phase retardation of the deformed polarizer 320. For example, the polymer material PL in the liquid crystal layer 333 can provide an overall compensation phase retardation constant value. For different local regions of the polarizer 320, the liquid crystals LC arranged in the different local regions of the liquid crystal layer 333 is electrically controlled to compensate phase retardation of the bent polarizer 320.

In some embodiments, the polymer material PL includes polyvinyl butyral or polystyrene, but the present disclosure is not limited thereto.

Figure 7:
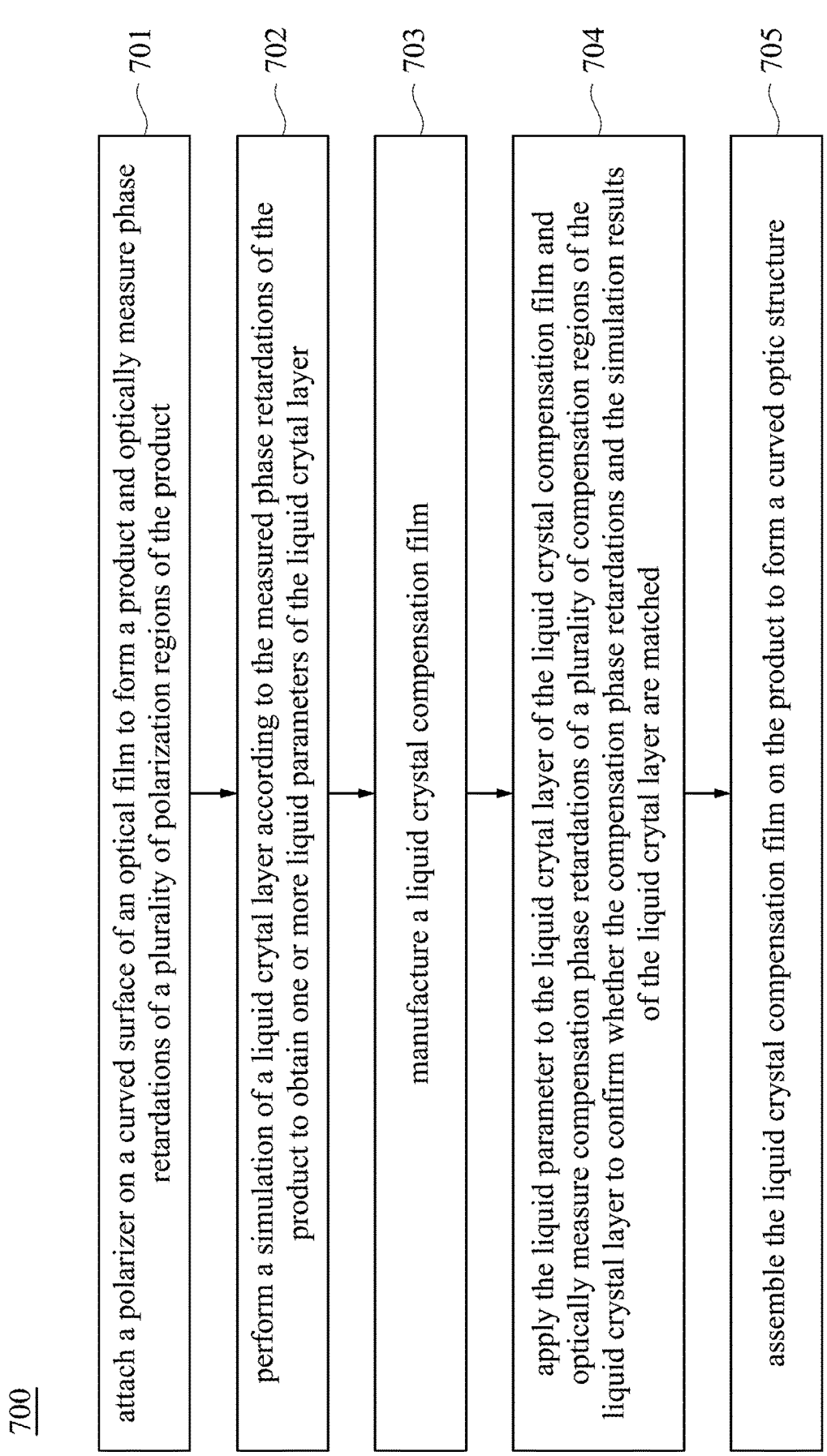
FIG. 7 illustrates a flowchart of a method of manufacturing a curved optic structure according to one embodiment of the present disclosure.

Reference is made by FIG. 7 to further illustrate exemplary flowcharts of manufacturing the curved optic structure of the present disclosure. FIG. 7 illustrates a flowchart of a method 700 of manufacturing a curved optic structure according to one embodiment of the present disclosure. The exemplary method 700 of manufacturing a curved optic structure includes operation 701 to operation 705.

Figure 8:
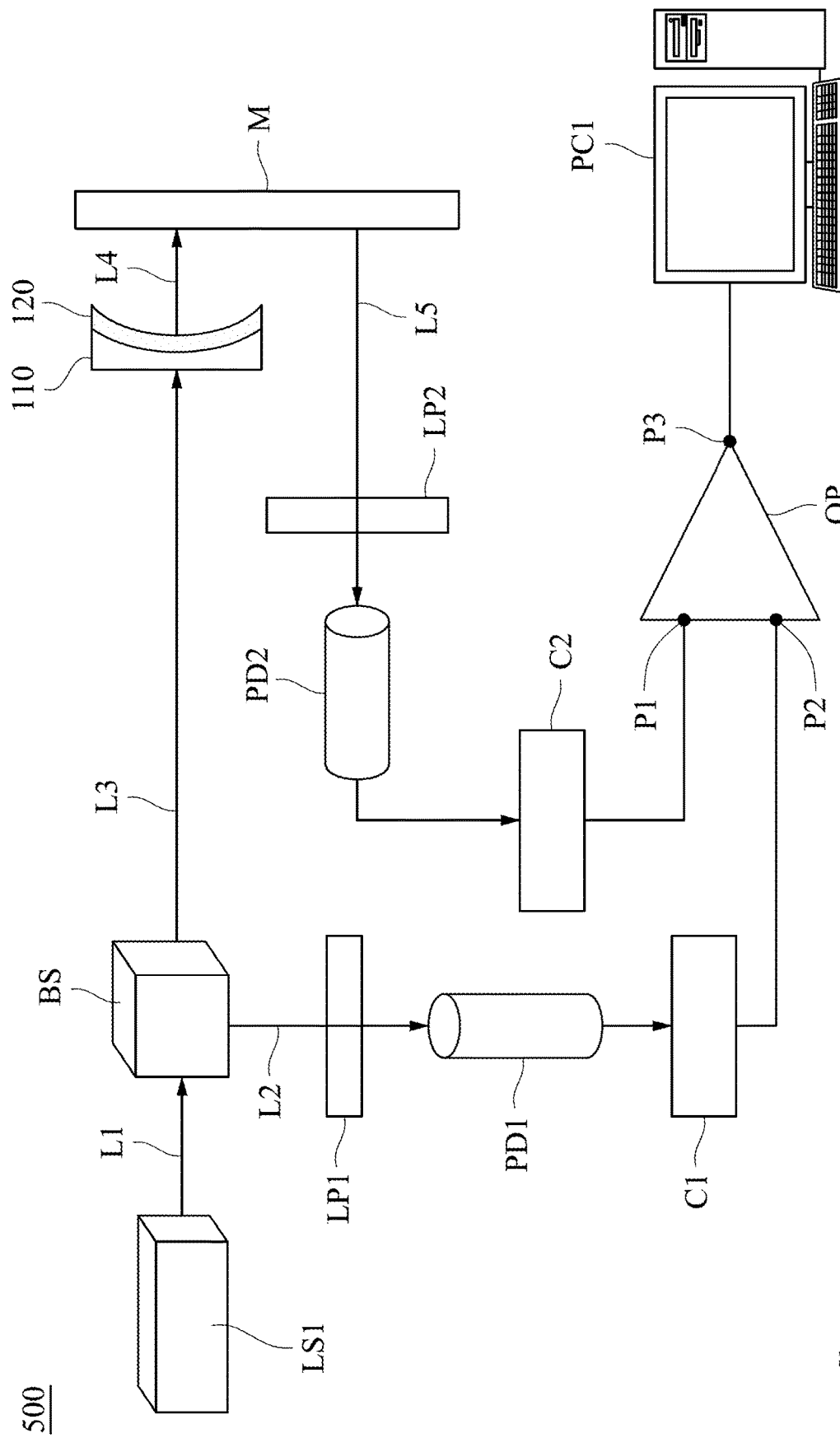
FIG. 8 is a schematic diagram illustrating an optical measurement system for measuring a product according to one embodiment of the present disclosure.

Reference is made by FIGS. 7 and 8. FIG. 8 is a schematic diagram illustrating an optical measurement system 600 for measuring a product according to one embodiment of the present disclosure. In operation 701, a product is formed by attaching the polarizer 120 to the curved surface 113 (as illustrated in FIG. 1) of the optic film 110 and optically measuring the phase retardations of a plurality of polarization regions of the product.

FIG. 8 illustrates an embodiment of optically measuring the phase retardation of a product formed by the optic film 110 and the polarizer 120. As shown in FIG. 8, the polarizer 120 is conformally attached to the curved surface 113 of the optic film 110 to form a product, and the product formed by the optic film 110 and the polarizer 120 is set in the optical measurement system 500 as a measurement sample.

In this exemplary embodiment, the optical measurement system 500 includes a laser light source LS1, a beam splitter BS, a polarizer LP1, a polarizer LP2, a photodetector PD1, a photodetector PD2, a counter C1, a counter C2, an operator OP, a mirror M and a computer PC1. In this exemplary embodiment, the laser light source LS1 is a Zeeman laser used for emitting a laser beam L1 of a single wavelength. For example, but not limited to the present disclosure, in this exemplary embodiment, the wavelength used by the laser light source LS1 is 633 nm.

The optical measurement system 500 includes two sets of light paths. One of the light paths of the optical measurement system 500 is to emit a light beam L1 from the laser light source LS1. The beam L1 is split by the beam splitter BS to emit a light beam L2. The beam L2 is converted into polarized light after passing through the polarizer LP1 and is received by the photodetector PD1. The photodetector PD1 is connected to the counter C1. The counter C1 is connected to the input port P2 of the operator OP.

Another set of light paths of the optical measurement system 500 is to emit a beam L1 from the laser light source LS1. The beam L1 is split by the beam splitter BS to emit a beam L3. After the beam L3 passes through the optic film 110 and the polarizer 120, the polarizer 120 induces phase retardations for the beam L3 such that the beam L3 is converted into a beam L4 with phase retardations. Then, the beam L4 is reflected by the mirror M as a beam L5, and the beam L5 is converted into polarized light after passing through the polarizer LP2 and received by the photodetector PD2. The photodetector PD2 is connected to the counter C2. The counter C2 is connected to the input port P1 of the operator OP.

After receiving the signals from the counter C1 and the counter C2, the operator OP outputs a comparison result to the computer PC1 through the output port P3, so that the computer PC1 can analyze phase retardation produced by the sample, which is the product including the optic film 110 and the polarizer 120. A phase difference between the beam L2 and the beam L5 is computed by the operator OP. By moving the position of the sample including the optic film 110 and the polarizer 120 disposed in the optical measurement system 500, the phase retardation corresponding to different local regions of the polarizer 120 can be obtained.

Therefore, the phase retardations generated by the different local regions of the product including the optic film 110 and the polarizer 120 can be compared through two sets of different light paths of the optical measurement system 500.

Figure 9:
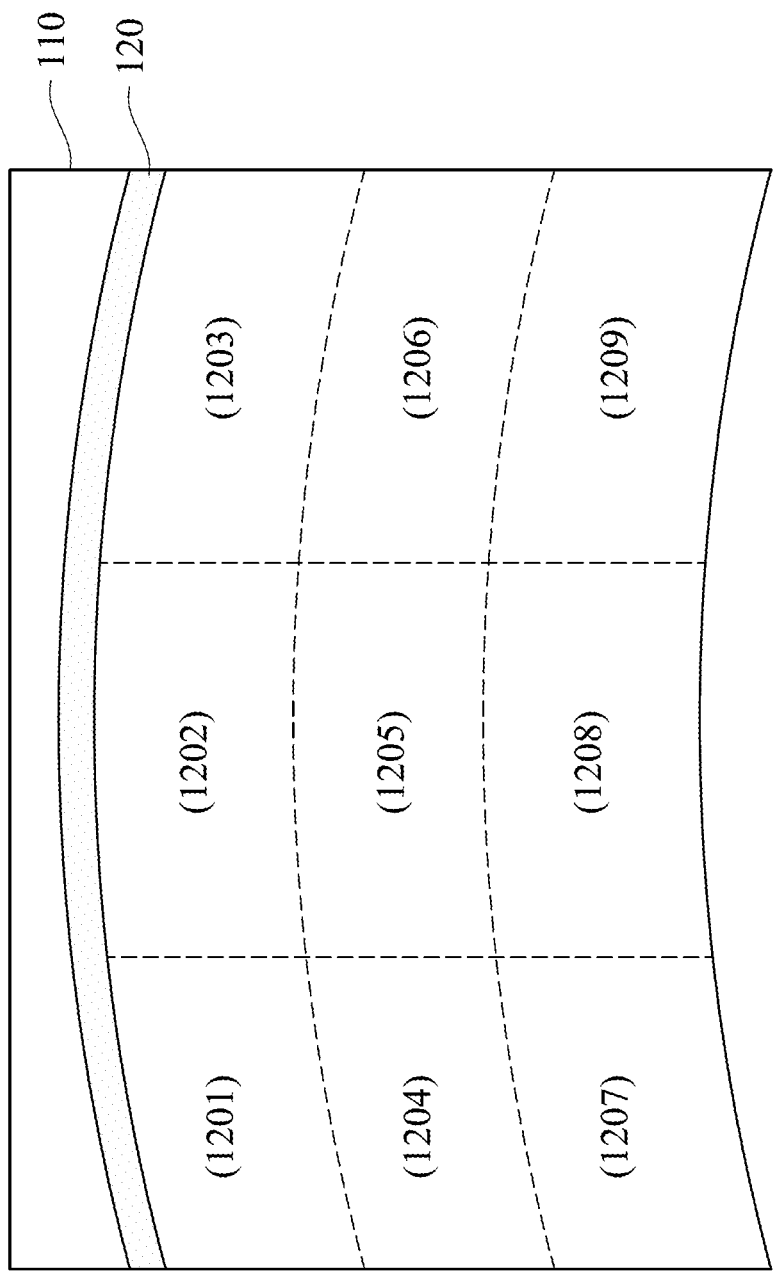
FIG. 9 schematically illustrates a front view of a product according to one embodiment of the present disclosure.

Reference is made by FIG. 9. FIG. 9 schematically illustrates a front view of a product including the optic film 110 and the polarizer 120 according to one embodiment of the present disclosure. In this exemplary embodiment, the curved surface 113 of the optic film 110 is a cylindrical surface, and the polarizer 120 is also deformed into a cylindrical surface after being attached to the curved surface 113.

In the optic film 110 and the polarizer 120 shown in FIG. 9, the polarizer 120 can be divided into nine different polarization regions, including a polarization region 1201, a polarization region 1202, a polarization region 1203, a polarization region 1204, a polarization region 1205, a polarization region 1206, a polarization region 1207, a polarization region 1208 and a polarization region 1209. In this exemplary embodiment, in the optical measurement system 500, the positions of the sample including the optic film 110 and the polarizer 120 can be moved, so that the beam L3 passes through one or more points of the polarization regions 1201 to the polarization regions 1209, that is, the phase retardations generated by the corresponding polarization regions can be obtained. For example, for one of the polarization regions 1201, the beam L3 can pass through one or more points in the polarization region 1201, one or more phase retardation values can be measured, and the measured one or more phase retardation values can be averaged so as to define a phase retardation reflecting the polarization region 1201 of the polarizer 120.

It should be noted that the division of the polarizer 120 into the polarization regions 1201 to 1209 in FIG. 8 is only an example and should not be used to limit the division of the polarization regions of the polarizer 120 of the present disclosure. For example, the polarizer 120 can be divided into a larger number of polarization regions, or the polarization regions can be divided according to the curvature of different positions of the polarizer 120 for phase retardation measurement.

In one or more embodiments of the present disclosure, the computer PC1 includes a personal computer, a server device, a mobile device, or other suitable measurement tools, but is not limited thereto.

Please return to FIG. 7. In the operation 701, the phase retardations generated by different local polarization regions 1201 to 1209 of the polarizer 120 can be obtained. Proceed to the operation 702, a simulation of a liquid crystal layer is performed according to the measured phase retardation of the product so as to obtain one or more liquid crystal parameters for the liquid crystal layer.

Figure 10:
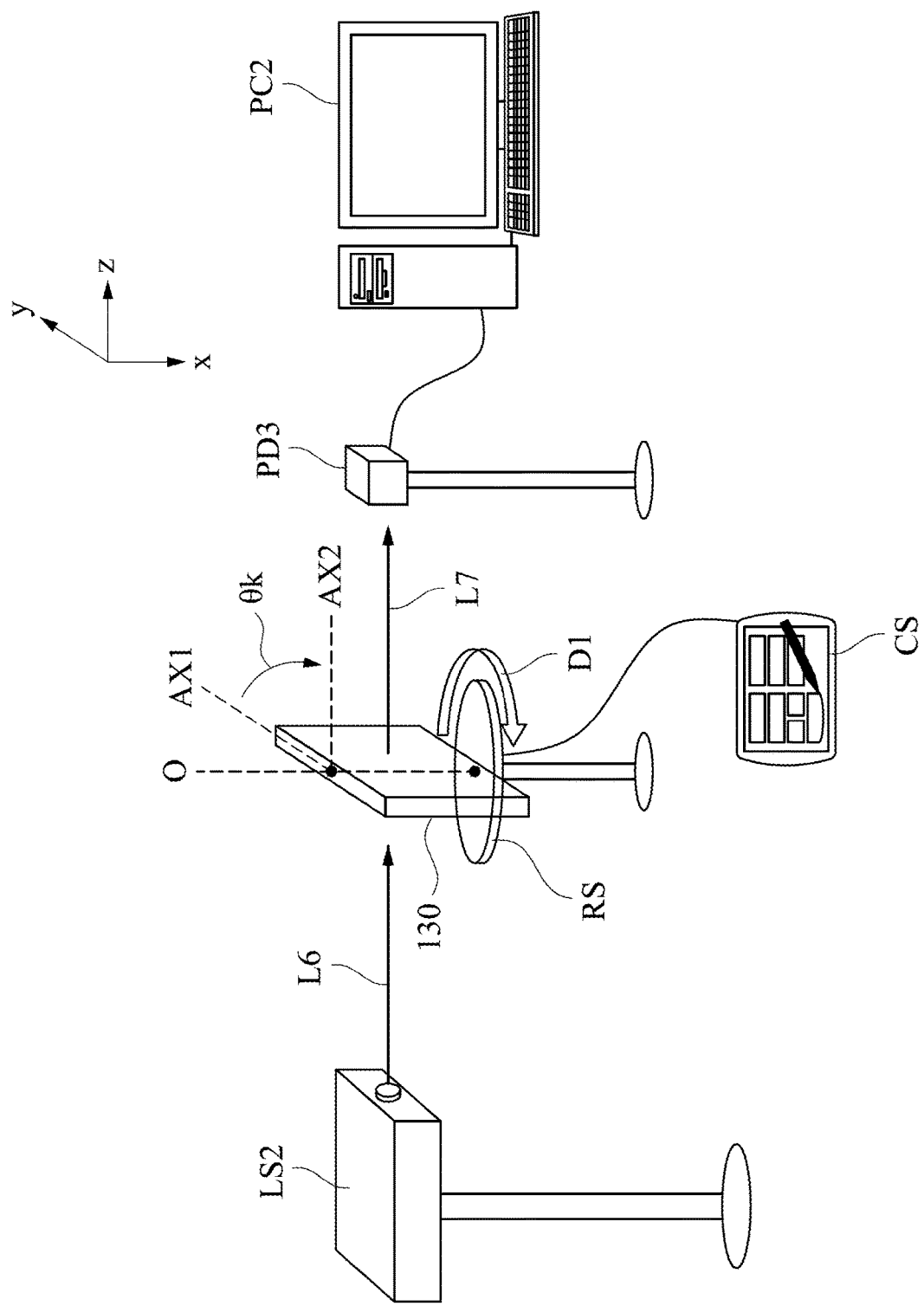
FIG. 10 is a schematic diagram of an optical measurement system for measuring a liquid crystal compensation film according to one embodiment of the present disclosure.

Reference is made by FIG. 10 to further describe a simulation of a crystal layer. FIG. 10 is a schematic diagram of an optical measurement system 600 for measuring a liquid crystal compensation film 300 according to one embodiment of the present disclosure.

In this embodiment, the optical measurement system 600 includes a laser light source LS2, a rotating stage RS, a control system CS, a photodetector PD3 and a computer PC2. The control system CS is connected to the rotation platform RS to control the rotating stage RS to rotate along a rotation axis O in a clockwise direction (e.g., direction D1 as illustrated in FIG. 10) or a counterclockwise direction. The liquid crystal compensation film 130 is disposed on the rotating stage RS, which can be regarded as a platform, wherein the liquid crystal compensation film 130 includes a liquid crystal layer 133 and a power supply 136 (as illustrated in FIG. 1). For the purpose of simple description, detail structure of the liquid crystal compensation film 130 including the liquid crystal layer 133 and the power supply 136 are not shown in FIG. 10.

In some embodiments, the laser light source LS2 comprises a Zeeman laser. In some embodiments, the laser light source LS2 uses laser light with a wavelength of 633 nm.

As shown in FIG. 10, the measurement light path of the optical measurement system 600 includes a beam L6 emitted from the laser light source LS2, and the beam L6 travels along the z direction toward the liquid crystal compensation film 130 placed on the rotating stage RS. The beam L6 is compensated for the phase retardation after passing through the liquid crystal compensation film 130, the beam L6 is converted into a beam L7, and the beam L7 is received by the photodetector PD3. The beam L7 reflects the reverse phase retardation compensated by the liquid crystal compensation film 130. The photodetector PD3 is connected to the computer PC2, and the compensation phase retardation provided by the liquid crystal compensation film 130 can be obtained through the computer PC2.

The rotating stage RS is rotatable along a rotation shaft O. In some embodiments of the present disclosure, the liquid crystal compensation film 130 may initially be disposed along a first axis AX1 passing through the rotation shaft O, and the axis AX1 is parallel to the y direction. After the rotating stage RS is rotated toward the direction D1, the liquid crystal compensation film 130 is disposed along a second axis AX2 passing through the rotation axis O, the axis AX2 deviates from the y direction, a rotation angle $\theta_k$ is between the axis AX1 and the axis AX2, and the rotation angle $\theta_k$ corresponds to an incident angle $\theta_k$ of the beam L6 incident to the liquid crystal compensation film 130.

Figure 11A:
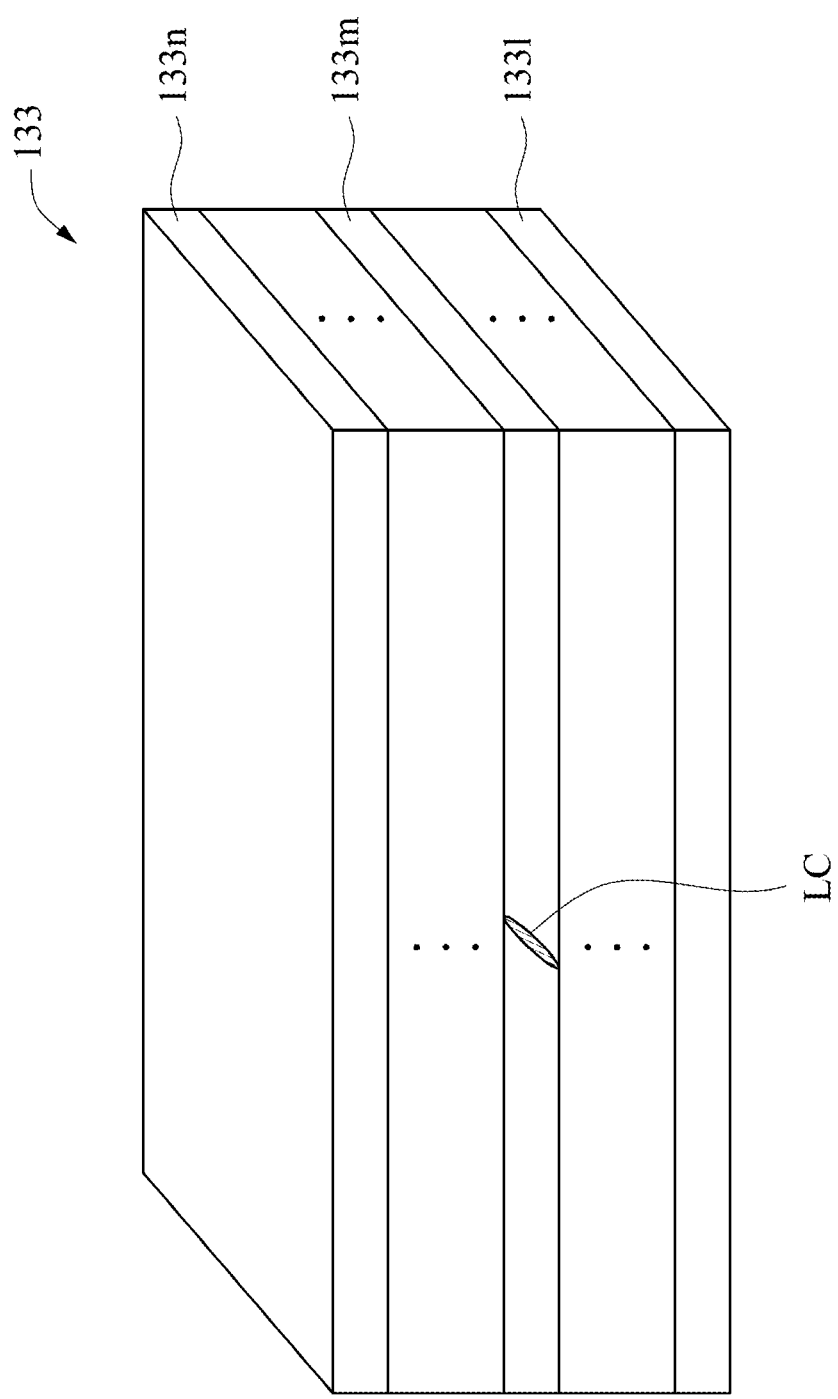
FIG. 11A schematically illustrates a side view of a liquid crystal layer of a liquid crystal compensation film according to one embodiment of the present disclosure.
Figure 11B:
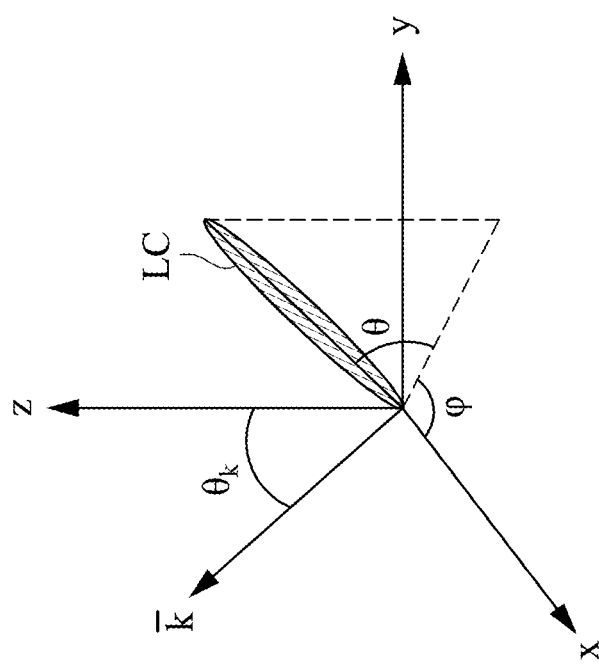

On the basis of the optical measurement system 600 shown in FIG. 10, please refer to FIG. 11A and FIG. 11B. FIG. 11A schematically illustrates a side view of a liquid crystal layer 133 of a liquid crystal compensation film 130 according to one embodiment of the present disclosure. FIG. 11B is a schematic diagram simulating a liquid crystal arrangement in FIG. 11A.

As shown in FIG. 11A, in some embodiments, the liquid crystal layer 133 of the liquid crystal compensation film 130 may be twisted nematic liquid crystal, and the liquid crystal layer 133 includes a liquid crystal sublayer 1331 to a liquid crystal sublayer 133n, which may have n layers in total. For one of the liquid crystal sublayers 133m in the liquid crystal layer 133, the liquid crystal sublayer 133m includes liquid crystals LC. The liquid crystal LC in one of the liquid crystal sublayers 133m of the liquid crystal layer 133 can be simulated by a relationship diagram as shown in FIG. 11B.

For the case that the beam L6 is incident on the liquid crystal compensation film 130 at the incident angle $\theta_k$ in FIG. 10, in FIG. 11B, the x-y plane is the extension direction of the liquid crystal sublayer 133m in the liquid crystal layer 133, wherein the liquid crystal LC in the liquid crystal sublayer 133m has an angle θ with respect to the x-y plane, and liquid crystal LC has an angle φ with respect to the z direction. A simulated beam k is incident on the liquid crystal sublayer 133m at an incident angle $\theta_k$, wherein the simulated beam k corresponds to the beam L6 as illustrated in FIG. 10.

In the schematic diagram illustrated in FIG. 11B, on the diagram shown in FIG. 11B, an optical dielectric tensor of the simulated beam k entering the single-layer liquid crystal sublayer 133m at the incident angle $\theta_k$ can be calculated by an expanding the Jones matrix. For the x direction, y direction and z direction of FIG. 11B, the optical dielectric tensor matrix ε is represented by the expression (1) as follows:

$$\varepsilon = \begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix}$$

The matrix elements of the optical dielectric tensor matrix ε can be calculated as follows with the following expression (2) of the formulas:

$\varepsilon_{xx} = n_o^2 + (n_e^2 - n_o^2)\cos^2\theta \cos^2\varphi$ $\varepsilon_{xy} = \varepsilon_{yx} = (n_e^2 - n_o^2)\cos^2\theta \sin\varphi \cos\varphi$ $\varepsilon_{xz} = \varepsilon_{zx} = (n_e^2 - n_o^2)\sin\theta \cos\theta \cos\varphi$ $\varepsilon_{yy} = n_o^2 + (n_e^2 - n_o^2)\cos^2\theta \sin^2\varphi$ $\varepsilon_{yz} = \varepsilon_{zy} = (n_e^2 - n_o^2)\sin\theta \cos\theta \sin\varphi$ $\varepsilon_{zz} = n_o^2 + (n_e^2 - n_o^2)\sin^2\theta$ In the above calculation of the matrix elements of the optical dielectric tensor matrix ε, the relationship between the angle θ of the liquid crystal LC relative to the x-y plane in the single-layer liquid crystal sublayer 133m and the angle φ is as shown in FIG. 11B, wherein $n_o$ is the ordinary light refractive index of the single-layer liquid crystal sub-layer 133m, $n_e$ is the extraordinary light refractive index of the single-layer liquid crystal sublayer 133m, and the values of $n_o$ and $n_e$ depend on the liquid crystal material in which the liquid crystal sublayer 133m is used for.

In this exemplary embodiment, during the simulation is performed, it is considered that all the liquid crystal sublayers 1331 to 133n in the liquid crystal layer 133 have compensated phase retardations for the simulated beam k. It is known that the simulated beam k is the unpolarized light corresponding to the laser beam L6. On the basis that the incident angle $\theta_k$ of the laser beam L6 can be controlled by the rotating stage RS, the compensation phase retardation of the beam L7 with respect to the beam L6 produced by the liquid crystal compensation film 130 can be simulated by a computer. That is, the compensation phase retardation that can be provided by the liquid crystal layer 133 of the liquid crystal compensation film 130 with different incident angles $\theta_k$ of the beam L6 can be obtained through the simulation calculations.

Figure 12:
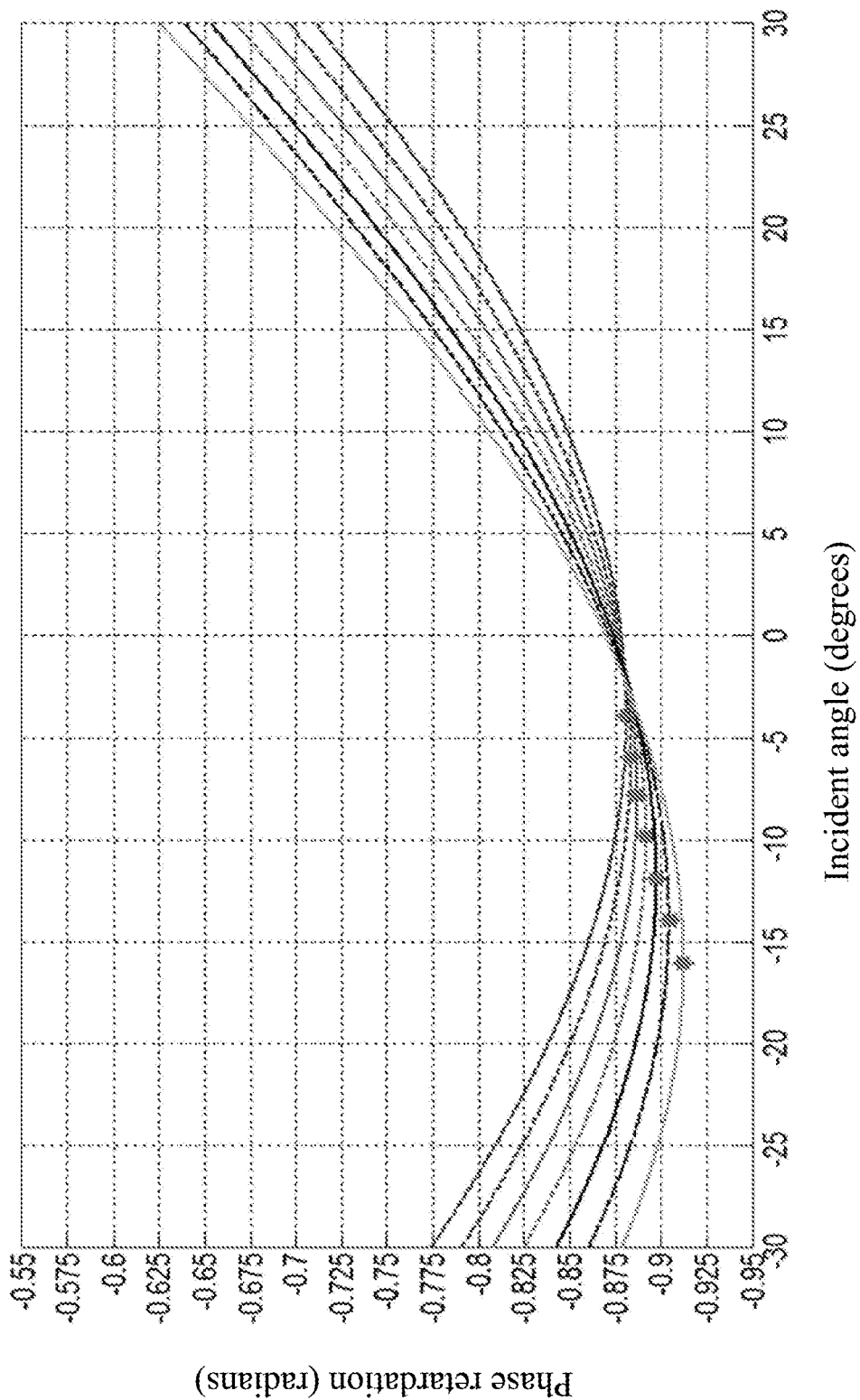
FIG. 12 illustrates a simulation result of simulating a liquid crystal compensation film.

FIG. 12 illustrates a simulation result of simulating a liquid crystal compensation film 130. The horizontal axis corresponds to different incident angles $\theta_k$ of the beam L6 in degrees. The vertical axis corresponds to the compensation phase retardation provided by the liquid crystal layer 133 of the liquid crystal compensation film 130 in radians. The one or more curves shown in FIG. 12 substantially represent a plurality of different sets of angles θ and φ of the simulated liquid crystal LC relative to the x-y plane.

As an example and not limited thereto, in some embodiments, the refractive index of ordinary light $n_0$ is set to 1.606, the refractive index of extraordinary light $n_e$ is set to 1.484, the thickness of the liquid crystal layer 133 is 3.3 μm, and the wavelength of the incident beam L6 is 633 nm. Different incident angles $\theta_k$ are set for simulation.

Specifically, as shown in FIG. 11B, the angle θ and angle φ of the liquid crystal LC relative to the x-y plane in the single-layer liquid crystal sublayer 133m substantially correspond to the pretilt angle of the liquid crystal LC in the liquid crystal sublayer 133m. In other words, the sets of different angles θ and φ of the liquid crystal LC relative to the x-y plane are the pretilt angles of the liquid crystal LC, and these pretilt angles are one or more groups of simulated liquid crystal parameters. The pretilt angles of the liquid crystal LC can be configured by a designed alignment film, for example, the first alignment film and the second alignment film as shown in FIG. 3.

Summarizing the operation 702 and referring to FIGS. 10-11B and the relational expressions (1) and (2), the simulation of the liquid crystal layer 133 of the liquid crystal compensation film 130 can be performed, and the pretilt angles that needs to be controlled for the liquid crystal LC in the liquid crystal layer 133 can be obtained as the one or more liquid crystal parameters.

Therefore, for the phase retardation in any of the polarization regions 1201 to 1209 of the polarizer 120 described in the operation 701, the corresponding compensation phase retardations can be provided by electronically controlling the pretilt angles of the liquid crystal LC in the liquid crystal layer 133 to reduce the unexpected phase retardations caused by the deformation of the polarizer 120.

Return to FIG. 7 and proceed to operation 703. According to the simulation results, the liquid crystal layer 133 is manufactured and the power supply 136 (as illustrated in FIG. 1) is connected to the first side and the second side opposite to first side of the liquid crystal layer 133 to form the liquid crystal compensation film 130.

Figure 13:
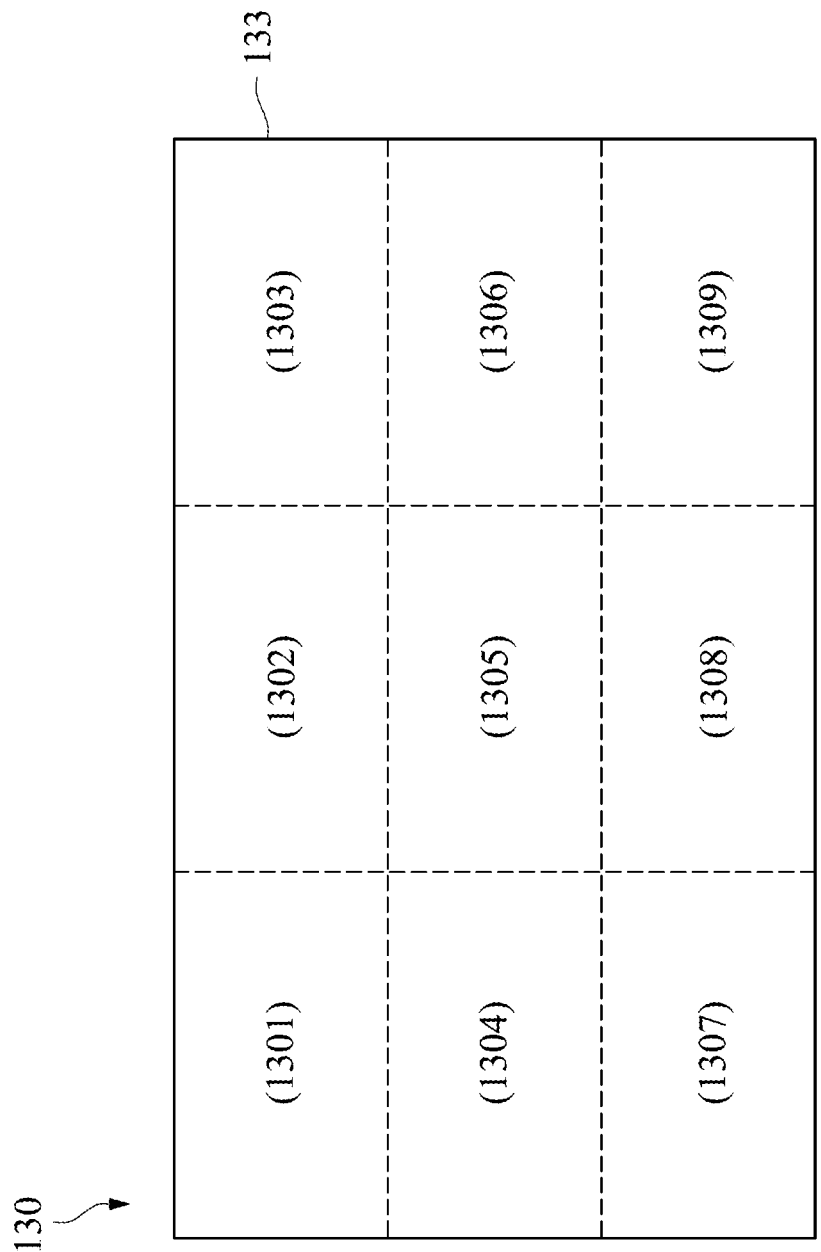
FIG. 13 schematically illustrates a front view of a liquid crystal compensation film according to one embodiment of the present disclosure.

Reference is made by FIG. 13. FIG. 13 schematically illustrates a front view of a liquid crystal compensation film 130 according to one embodiment of the present disclosure. For the purpose of simple description, only liquid crystal layer 133 of the liquid crystal compensation film 130 is illustrated in FIG. 13.

Return to FIG. 7 and proceed to operation 704, apply the liquid parameter to the liquid crystal layer 133 of the liquid crystal compensation film 130 by the power supply 136 and optically measure compensation phase retardations of a plurality of compensation regions of the liquid crystal layer 133 to confirm whether the compensation phase retardations and the simulation results of the liquid crystal layer 133 are matched.

In FIG. 13, the liquid crystal layer 133 includes a compensation region 1301, a compensation region 1302, a compensation region 1303, a compensation region 1304, a compensation region 1305, a compensation region 1306, a compensation region 1307, a compensation region 1308 and a compensation region 1309. For any of the compensation regions 1301 to 1309 of the liquid crystal layer 133, the power supply 136 can be used to perform electrical control functions to adjust the angle of the liquid crystal LC in the compensation regions 1301-1309 to provide corresponding compensation phase retardation as simulated.

In some embodiments, the compensation regions 1301-1309 of the liquid crystal layer 133 substantially correspond to the division of the polarization region 1201 to the polarization region 1209 of the polarizer 120. In some embodiments, corresponding to the division manner of the polarization region of the polarizer 120, the division manner of the compensation region of the liquid crystal layer 133 is not limited to the aspect as shown in FIG. 13.

Figure 14:
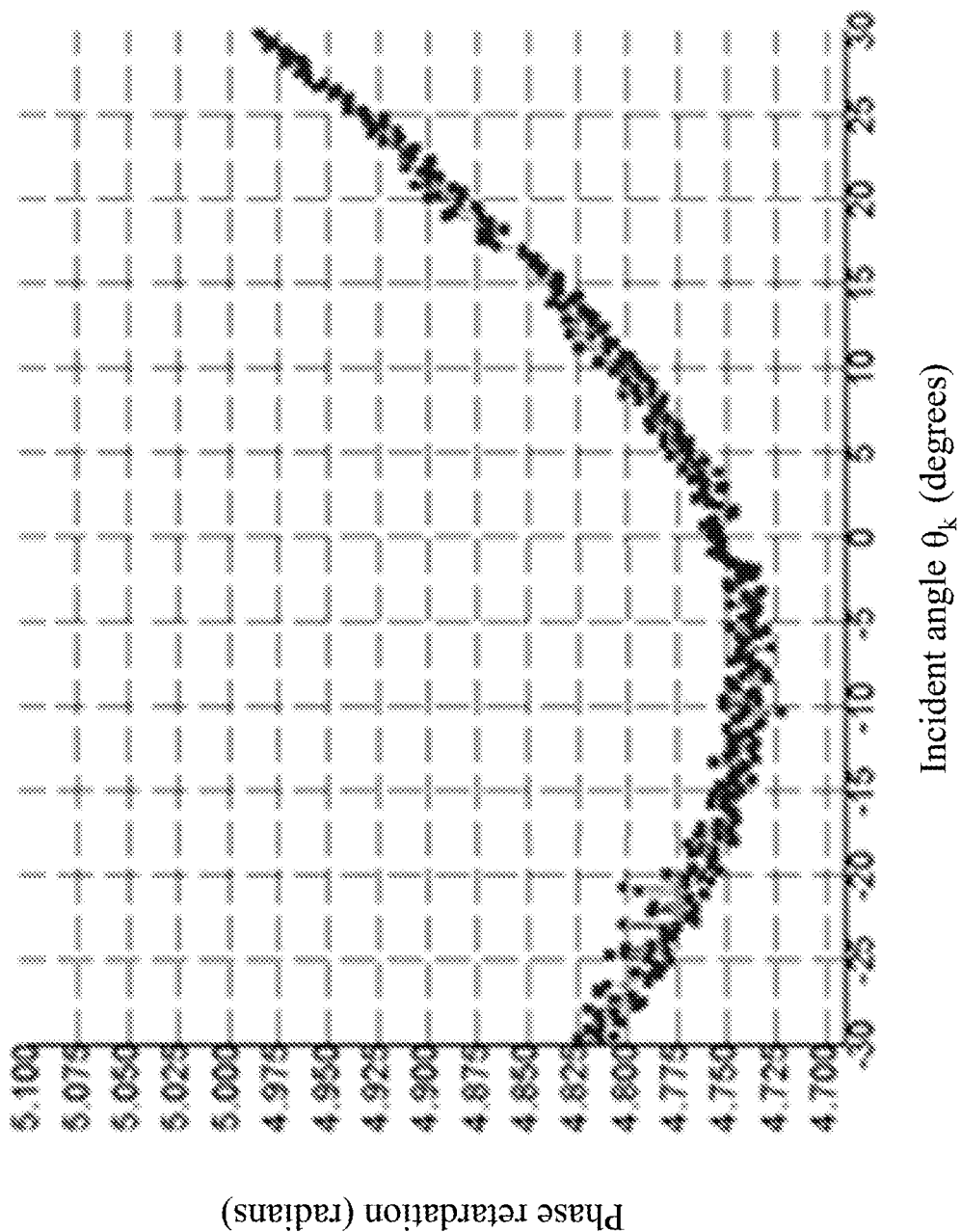
FIG. 14 illustrates a measurement result of measuring the liquid crystal compensation film.

Reference is made by FIG. 14. FIG. 14 illustrates a measurement result of measuring the liquid crystal compensation film 130. The measurement result corresponds to the measurement result of the compensated phase retardation of the liquid crystal LC in one of the electrically controlled compensation regions 1301-1309 of the electrically controlled liquid crystal layer using the simulated pretilt angles. In this embodiment, the liquid crystal compensation film 130 is disposed in the optical measurement system 600 as shown in FIG. 10 to perform optical measurements. The horizontal axis of FIG. 14 corresponds to the different incident angles $\theta_k$ of the beam L6 in degrees. The vertical axis of FIG. 14 corresponds to the compensation phase retardation provided by the liquid crystal layer 133 of the liquid crystal compensation film 130 in radians. In FIG. 14, the incident angles $\theta_k$ and the provided compensations phase retardation have a trend similar to that of the simulation results in FIG. 12, reflecting the agreement with the simulation results.

Proceed to operation 705, the liquid crystal compensation film 130 is assembled on the product including the optic film 110 and the polarizer 120 to form a curved optic structure 100 as shown in FIG. 1.

In this exemplary embodiment, after the liquid crystal compensation film 130 is assembled with the product including the optic film 110 and the polarizer 120, the compensation region 1301, the compensation region 1302, the compensation region 1303, the compensation region 1304, the compensation region 1305, the compensation region 1306, and the compensation region 1307, the compensation region 1308 and the compensation region 1309 of the liquid crystal layer 133 respectively correspond to the projected regions of the polarization region 1201, the polarization region 1202, the polarization region 1203, the polarization region 1204, the polarization region 1205, the polarization region 1206, the polarization region 1207, the polarization region 1208 and the polarization region 1209 of the polarizer 120. Therefore, for each of the polarization regions 1201-1209 of the polarizer 120, compensation phase retardations can be provided by a corresponding one of the compensation regions 1301 to 1309 of the liquid crystal compensation film 130.

For example, in one or more embodiments of the present disclosure, the polarizer 120 has a polarization region 1201 and a polarization region 1202, and the polarization region 1201 and the polarization region 1202 of the polarizer 120 correspond to different positions on the curved surface of the optic film 110, respectively. The liquid crystal layer 133 has a compensation region 1301 and a compensation region 1302. The compensation region 1301 of the liquid crystal layer 133 corresponds to the projection of the polarization region 1201 of the polarizer 120 on the liquid crystal layer 133, and the compensation region 1302 of the liquid crystal layer corresponds to the projection of the polarization region 1202 of the polarizer 120. The phase retardation of the polarization region 1201 plus the compensation phase retardation of the compensation region 1301 is equal to the phase retardation of the polarization region 1202 plus the compensation phase retardation of the compensation region 1302. In some embodiments, by electrically controlling the liquid crystal layer 133, the phase retardation of the polarization region 1201 plus the compensation phase retardation of the compensation region 1301 can be equal to 0 or close to 0, and the phase retardation of the polarization region 1202 plus the compensation phase retardation of the compensation region 1302 is equal to 0 or close to 0. Therefore, the phase retardation caused by the deformation of the polarizer 120 can be substantially cancelled.

In some embodiments, the operation 705 of the method 700 for manufacturing the curved optic structure can be performed before the operation 704, so that the liquid crystal layer 133 can be electrically controlled by the power supply 136 to ensure whether the overall phase retardation is cancelled after the liquid crystal compensation film 130 is assembled with the product including the optic film 110 and the polarizer 120.

In summary, the curved optic structure and the manufacturing method of manufacturing the curved optic structure the present disclosure can compensate the different phase retardations of the different polarized regions of the bent polarizer by using the liquid crystal compensation film, which can improve the birefringence characteristic caused by the curved surface of the optic film being attached to the polarizer, thereby improving the optical properties of the optic film, and the variation of phase retardation, polarization state and optical properties of the polarizer caused by deformation of the polarizer can be reduced. The curved optic structure and the manufacturing method of manufacturing the curved optic structure can be applied to various curved surface bonding devices.

Although the present disclosure has been described in considerable detail with reference to certain embodiments thereof, other embodiments are possible. Therefore, the spirit and scope of the appended claims should not be limited to the description of the embodiments contained herein. In view of the foregoing, it is intended that the present disclosure cover modifications and variations of this invention provided they fall within the scope of the following claims.

What is claimed is:

1. A curved optic structure, comprising:
    an optic film comprising a light incident side and a light exit side, wherein the optic film has a concave surface on the light exit side;
    a polarizer conformally attached on the concave surface of the optical film; and
    a liquid crystal compensation film disposed at the light exit side of the optic film, wherein the polarizer is located between the optic film and the liquid crystal compensation film, the liquid crystal compensation film comprises:
    a liquid crystal layer comprising a plurality of liquid crystals inside; and
    a power supply connected to a first side surface and an opposite second side surface of the liquid crystal layer,
    wherein the polarizer has a first polarization region and a second polarization region, the first polarization region and the second polarization region of the polarizer correspond to different positions on the concave surface of the optic film, respectively, the liquid crystal layer has a first compensation region and a second compensation region, the first compensation region of the liquid crystal layer corresponds to a projection of the first polarization region of the polarizer on the liquid crystal layer, the second compensation region of the liquid crystal layer corresponds to a projection of the second polarized region of the polarizer on the liquid crystal layer, a first phase retardation of the first polarization region plus a first compensation phase retardation of the first compensation region is equal to a second phase retardation of the second polarization region plus a second compensation phase retardation of the second compensation region, and the first phase retardation of the first polarization region is different from the second phase retardation of the second polarization region.

2. The curved optic structure of claim 1, wherein the optic film, the polarizer and the liquid crystal compensation film are sequentially arranged along a first direction, and the concave surface of the optic film is recessed from a plane perpendicular to the first direction.

3. The curved optic structure of claim 1, wherein the optic film, the polarizer and the liquid crystal compensation film are sequentially arranged along a first direction, the liquid crystal layer of the liquid crystal compensation film is extended along a plane perpendicular to the first direction, and the concave surface of the optic film is recessed from the plane along the first direction.

4. The curved optic structure of claim 1, wherein the concave surface comprises a cylindrical surface, a spherical surface or a symmetrical aspheric surface.

5. The curved optic structure of claim 1, wherein a gap is between the polarizer and the liquid crystal compensation film.

6. The curved optic structure of claim 1, wherein an optical transparent adhesive is filled in a gap between the polarizer and the liquid crystal compensation film.

7. The curved optic structure of claim 1, wherein the liquid crystal layer of the liquid crystal compensation film further comprises:
    a first alignment film and a second alignment film, wherein the liquid crystals are filled between the first alignment film and the second alignment film.

8. The curved optic structure of claim 1, wherein the liquid crystal compensation film is attached to the polarizer, and the liquid crystal layer of the liquid crystal compensation film is conformal to the concave surface of the optic film.

9. The curved optic structure of claim 1, wherein the liquid crystal compensation film is attached to the polarizer, the liquid crystal layer of the liquid crystal compensation film is conformal to the concave surface of the optic film, and the liquid crystal layer further comprises a polymeric material.

10. The curved optic structure of claim 1, wherein the liquid crystal layer comprises a plurality of liquid crystal sublayers, and each of the liquid crystal sublayer comprises one or more of the liquid crystals.

11. The curved optic structure of claim 1, wherein the liquid crystal compensation film further comprises:
    a first transparent substrate;
    a first transparent electrical control structure disposed on a surface of the first transparent substrate, on the first side surface of the liquid crystal layer and connected to the power supply;
    a second transparent substrate; and
    a second transparent electrical control structure disposed on a surface of the second transparent substrate, on the second side surface of the liquid crystal layer and connected to the power supply, wherein the liquid crystal layer is located between the first transparent electrical control structure and the second transparent electrical control structure.

12. The curved optic structure of claim 11, wherein the first transparent substrate and the second transparent substrate are flexible.

13. The curved optic structure of claim 11, wherein at least one of the first transparent electrical control structure and the second transparent electrical control structure includes a plurality of thin film transistors.

14. The curved optic structure of claim 1, wherein the optic film and the polarizer collectively form as a lens having a negative diopter.

15. The curved optic structure of claim 1, wherein the optic film, the polarizer and the liquid crystal compensation film are sequentially arranged along a first direction, the optic film has a horizontal surface on the light incident side, and the horizontal surface is perpendicular to the first direction.

\* \* \* \* \*